United States Patent [19]
Olson et al.

[11] Patent Number: 5,863,020
[45] Date of Patent: Jan. 26, 1999

[54] LIFELINE MOUNTING APPARATUS

[75] Inventors: Wayne L. Olson, Central Point, Oreg.; Gary E. Choate, Lakewood, Colo.

[73] Assignee: Rose Manufacturing Company, Englewood, Colo.

[21] Appl. No.: 742,032

[22] Filed: Nov. 1, 1996

Related U.S. Application Data

[60] Provisional application No. 60/007,168 Nov. 1, 1995.

[51] Int. Cl.⁶ .................................................. A47B 96/06
[52] U.S. Cl. .................................. 248/228.3; 248/228.5; 182/3; 182/13
[58] Field of Search .............................. 248/228.1, 228.3, 248/228.5, 230.2, 230.5, 231.41, 231.61, 316.6, 316.4, 72; 182/3, 13

[56] References Cited

U.S. PATENT DOCUMENTS

| | | | |
|---|---|---|---|
| 1,473,504 | 11/1923 | Neely | 191/40 |
| 2,708,557 | 5/1955 | Clark | 248/228.4 |
| 2,765,139 | 10/1956 | White | 248/228.4 |
| 2,812,918 | 11/1957 | Longino | 248/316.4 |
| 3,002,726 | 10/1961 | Ford | 254/67 |
| 4,767,091 | 8/1988 | Cuny | 248/228 |
| 4,799,639 | 1/1989 | Riley | 248/228 |
| 5,354,026 | 10/1994 | Bulla | 248/229 |
| 5,397,042 | 3/1995 | Pedrini | 224/329 |
| 5,526,896 | 6/1996 | O'Rourke | 182/3 |
| 5,529,144 | 6/1996 | Henderson | 182/3 |
| 5,659,904 | 8/1997 | Doczy et al. | 4/577.1 |

*Primary Examiner*—Leslie A. Braun
*Assistant Examiner*—Gwendolyn Baxter
*Attorney, Agent, or Firm*—James G. Uber; Joseph J. Kelly

[57] ABSTRACT

Clamping apparatus for providing a fixed support on a fixed beam or other similar structures wherein outer and inner elongated members are mounted for relative sliding telescoping movement therebetween and are moved by a rotatable threaded bolt and each of the outer and inner elongated members have an inclined surface so that when the inclined surface of the jaws contact the opposite side edges of the fixed beam the facing surfaces of the fixed beam and the outer and inner elongated members are moved into intimate contact.

7 Claims, 3 Drawing Sheets

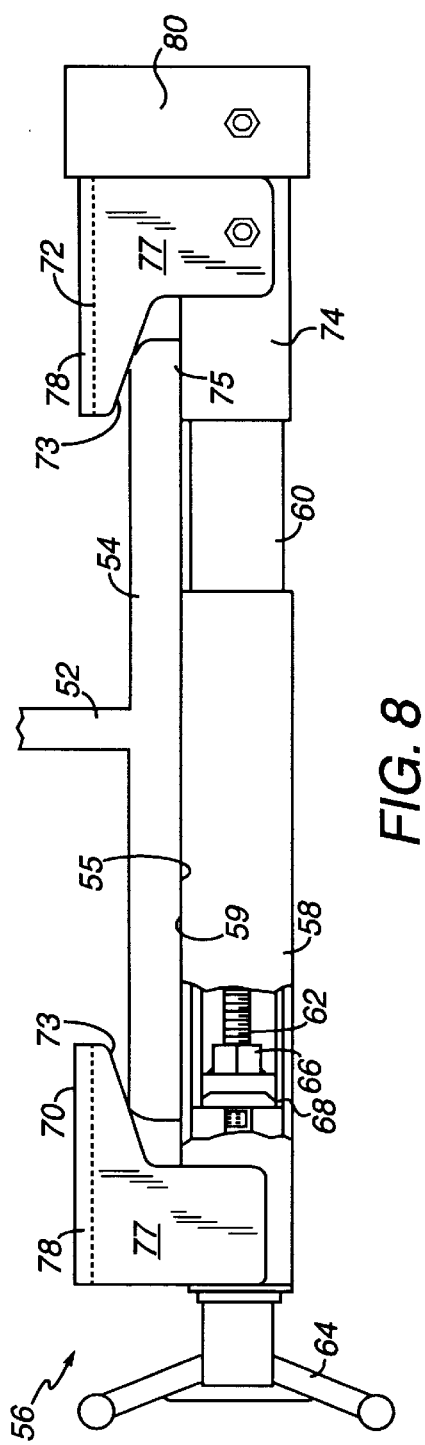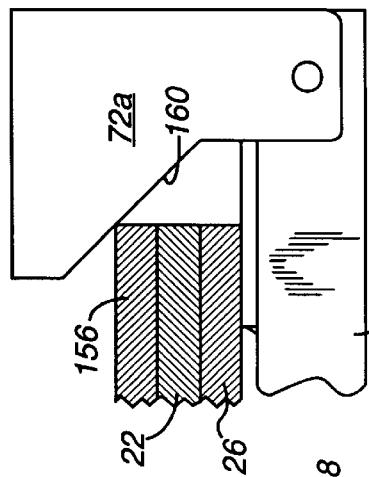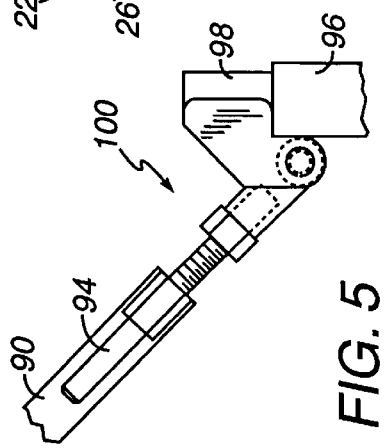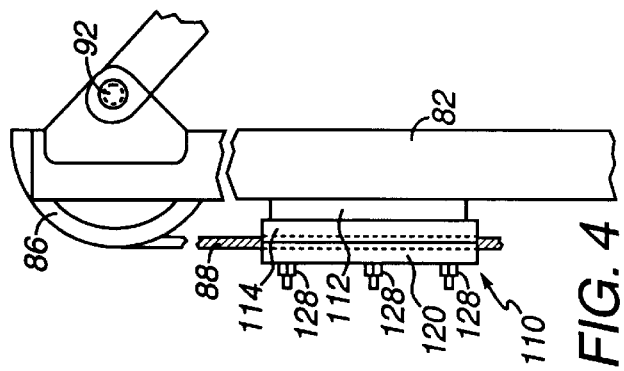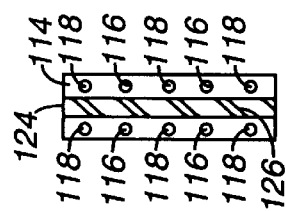

LIFELINE MOUNTING APPARATUS

This application claims the priority date of U. S. Provision Application No. 60/007,168 filed Nov. 1, 1995.

FIELD OF THE INVENTION

This invention relates generally to lifeline or other mounting apparatus and more specifically to mounting apparatus for mounting lifeline or other apparatus to a beam or a rail.

BACKGROUND OF THE INVENTION

There are many instances where it is desired to mount safety apparatus or construction apparatus or other type of apparatus to a beam or a rail. Some examples of mounting apparatus for this purpose are found in U.S. Pat. Nos. 5,526,896; 2,765,139; 5,354,026; 4,767,091 and 4,799,639. This application discloses clamping apparatus that functions to provide a strong support for the mounting of any desired type of apparatus to beams or rails of varying configurations.

BRIEF DESCRIPTION OF THE INVENTION

This invention provides clamping apparatus including support structure so that various types of apparatus may be supported at desired locations on a beam or rail.

In a preferred embodiment of the invention, the mounting clamp has an outer elongated member and at least a portion of an inner elongated member mounted for telescoping relative sliding movement. A rotatable bolt is mounted in the outer member and is rotated by a suitable crank mounted on one end of the rotatable threaded bolt. A threaded nut is mounted on a fixed support secured to the inner member and the threaded bolt is threaded into the threaded nut so that rotation of the bolt causes relative sliding motion between the outer and inner elongated members. The outer elongated member preferably has a generally rectangular transverse cross-sectional configuration and has a generally planar surface located to contact the generally planar surface of the beam to provide a strong supporting relationship. At least another portion of the inner elongated member also has a generally planar surface located to contact a portion of the generally planar surface of the beam for the same purpose. A first jaw, having a generally inverted U-shape transverse cross-sectional configuration, is secured to the outer elongated member for movement therewith. The first jaw has a flange projecting therefrom preferably having two inclined surfaces for contacting one of the opposite side edges of the beam. A second jaw, having a generally inverted transverse U-shape cross-sectional configuration, is secured to the inner elongated member for movement therewith. The second jaw has a flange portion projecting therefrom preferably having two inclined surfaces for contacting the other of the opposite side edges of the beam. The outer and inner elongated members have mating transverse cross-sectional configurations so as to prevent relative rotational movement therebetween and such transverse cross-sectional configurations preferably are generally rectangular. In some instances, a reinforcing plate extends between the flange portions of the first or second jaw.

BRIEF DESCRIPTION OF THE DRAWINGS

Preferred embodiments of the invention are illustrated in the drawings in which:

FIG. 4 is a side elevational view of a portion of FIG. 3;

FIG. 5 is a side elevational view of another portion for use with the portion of FIG. 3;

FIGS. 6 and 7 are elevational views of the cable locking clamp of this invention;

FIG. 8 is a front elevational view of a mounting clamp;

FIG. 9 is a partial front elevational view of a modification of FIG. 8;

DETAILED DESCRIPTION OF THE INVENTION

Figure 1:
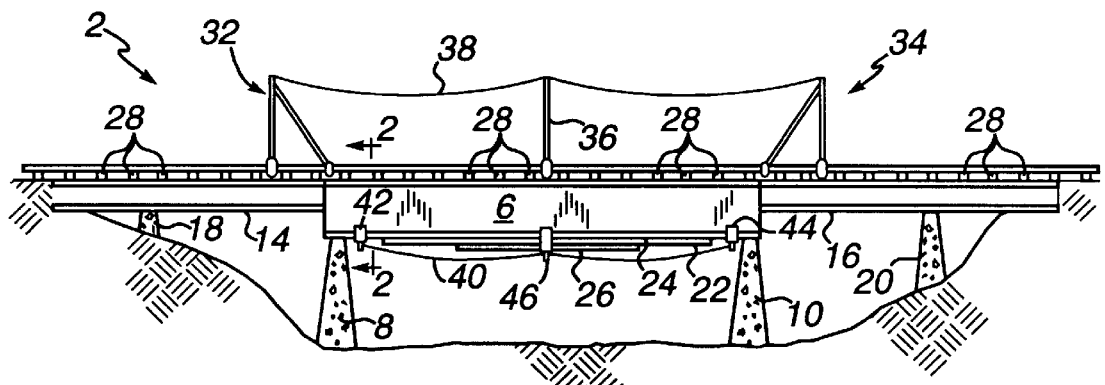
Fig. 1 is a schematic side elevational view of a railroad bridge having lifelines mounted thereon.
Figure 2:
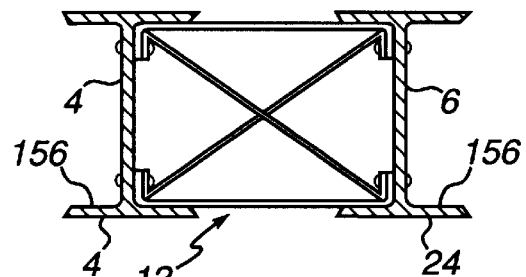
FIG. 2 is a cross-sectional view taken on the line 2—2 of FIG. 1.

In FIG. 1, there is illustrated a conventional railroad bridge 2. A pair of I-beams 4 and 6 are mounted on fixed supports 8 and 10. A plurality of reinforcing bars 12, FIG. 2, are secured to the I-beams 4 and 6. Smaller I-beams 14 and 16 are secured to the I-beams 4 and 6 by suitable means, such as by welding (not shown), and are mounted on fixed supports 18 and 20. A first reinforcing plate 22 is secured to the lower portion 24 of the I-beam 4 and 6 by suitable means such as by welding. A shorter second reinforcing plate 26 is secured to the first reinforcing plate 22 by suitable means, such as by welding. Railroad ties 28 are secured to the I-beams 4, 6, 14 and 16 by conventional means. Railroad rails 30 are secured to the railroad ties 28 by conventional means. A first support apparatus 32 is mounted on a railroad rail 30 adjacent to one end of the I-beams 4 and 6 and a second support apparatus 34 is mounted on a railroad rail 30 adjacent to the other end of the I-beams 4 and 6. A third support apparatus 36 is mounted on a railroad rail 30 midway between the first and second support apparatus 32 and 34. A lifeline 38 is mounted on the first, second and third support apparatus 32, 34 and 36.

Another lifeline 40 is mounted on a first clamp 42 mounted on the lower portion 24 of one of the I-beams 4 or 6 and a second clamp 44 also is mounted on the same I-beam 4 or 6. The another lifeline 40 is also mounted on a third clamp 46 mounted on the lower portion 24, the first reinforcing plate 22 and the second reinforcing plate 24.

Figure 3:
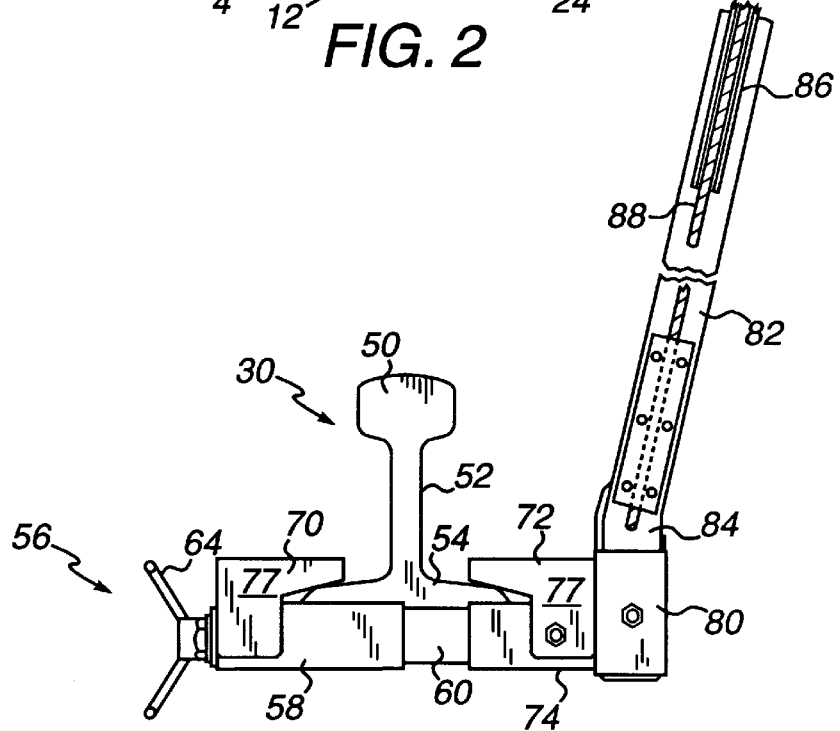
FIG. 3 is a front elevational view of the mounting of one portion of a support for a lifeline.

In FIGS. 3–8, there is illustrated apparatus for mounting the lifeline 38 on the I-beams 4 or 6 or on a railroad rail 30 having and enlarged head portion 50, a stem portion 52 and a base portion 54. The apparatus includes an adjustable clamp 56 having a hollow outer elongated member 58 and a hollow inner elongated member 60 having aligned longitudinal axes. Preferably, the outer and inner elongated members have a transverse cross-sectional configuration to prevent relative rotational movement therebetween which transverse cross-sectional configuration is generally rectangular. A rotatable threaded bolt 62 is mounted in the outer member 58 and is rotated by the crank 64. A threaded nut 66 is mounted on a fixed support 68 of the inner member 60 in threaded engagement with the threaded bolt 62 so that rotation of the threaded bolt 62 causes relative sliding movement between the outer 58 and inner 60 elongated members. A jaw 70 is secured to the outer member 58 and a jaw 72 is secured to a base portion 74 of the inner member 60. Each of the jaws 72 and 70 has an inverted U-shaped transverse cross-sectional configuration. Each of the jaws 72 and 70 have leg portions 77 which are secured to opposite sidewalls of the outer and inner elongated members 58 and 60 and an integral connecting portion 78. As illustrated in FIGS. 3 and 8, the outer 58 and inner 60 members have been moved so that the base 54 is clamped between the jaws 70 and 72. The outer elongated member 58 has a generally planar surface 59, the base portion 74 has a generally planar surface 75 and the base 54 has a generally planar surface 55 all of which are moved into an intimate contacting relationship by the inclined surfaces 73 of the jaws 70 and 72.

A hollow support 80 having a rectangular cross-sectional configuration (not shown) is secured to the base portion 74. A support arm 82 extends at an angle from the base portion 84 so that the support arm 84 is spaced outwardly from the railroad rail 30. Guide means 86 are mounted on the support arm 82 for receiving a portion of the cable 88. A bracing member 90, FIG. 5, is pivotally mounted at one end to the support arm 82 by pivot means 92. A support 96, similar to the support 80, is mounted on another clamp, similar to that in FIGS. 3 and 8, secured to the railroad rail 30. A base portion 98 is mounted on the support 96 and is connected to the other end of the bracing member 90 by a turnbuckle arrangement 100 which is pivotally mounted on the base portion 98 so that the length of the bracing member 90 may be adjusted.

Cable clamping means 110 are illustrated in FIGS. 4, 6 and 7 and comprise a base member 112 secured to the support arm 82 and a first clamping member 114 secured to the base member 112 by bolts (not shown) passing through threaded openings 116 and received in threaded openings (not shown) in the base member 112. The first clamping member 114 has a plurality of threaded stud bolts 118 projecting outwardly therefrom. A second clamping member 120 has a plurality of openings 122 formed therein. Each of the first 114 and second 120 clamping members has a recess 124 having a surface contour 126 similar to the surface contour of the cable 88 so that, when the cable 88 is clamped between the first 114 and second 120 clamping members, the surface contour of the cable 88 will be in contact with the surface contour 126 of the recesses 124. The second clamping member 120 is secured to the first clamping by passing the openings 122 over the threaded stud bolts 118 and using nuts 128 to tighten the first 114 and second 120 clamping members together.

The apparatus illustrated in FIGS. 3–8 may be used as either the first 32 or second 34 support apparatus. If used as the first support apparatus 32, then the second support apparatus 34 would have lifeline tensioning apparatus, such as that illustrated and described in U.S. Pat. No. 5,458,214, mounted thereon instead of the clamping means 110. Clamping means similar to the adjustable clamp 56 are used to support conventional support means as the third support apparatus 36.

Figure 10:
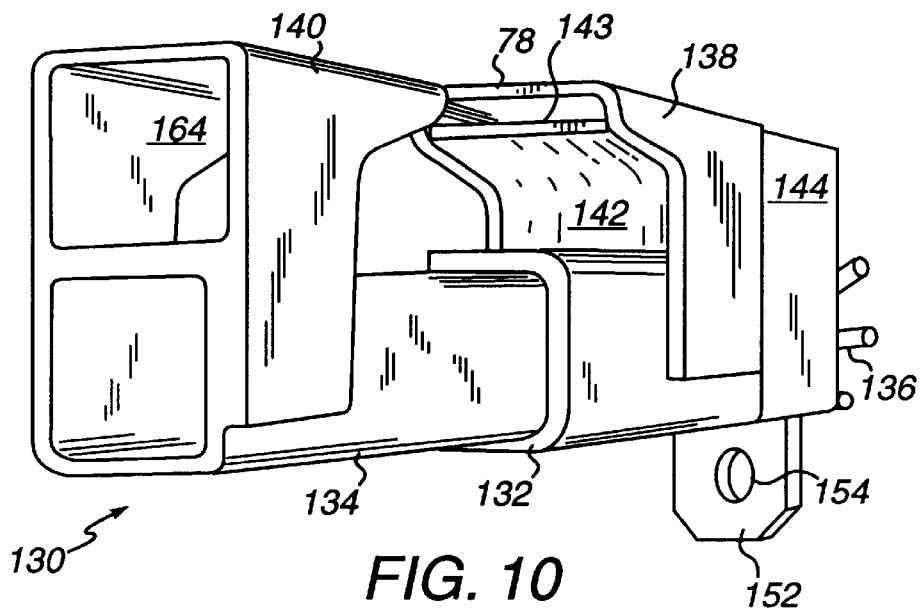
FIG. 10 is a perspective view of another mounting clamp.

Another embodiment of an adjustable clamp 130 is illustrated in FIG. 10. The adjustable clamp 130 is similar to the adjustable clamp 56 and has an outer member 132 and an inner member 134 that are moved relative to each other by a threaded bolt, similar to the threaded bolt 62, rotated by the crank 136. A first jaw 138, generally similar to the jaw 70, is secured to the outer member 132 and a second jaw 140, generally similar to the jaw 72, is secured to the inner member 134. A reinforcing plate 142 is secured to the first jaw 138 and has a portion 143 that is spaced from the connecting portion 78. A hollow support 144 is secured to the first jaw 138 by suitable means such as by welding, and has an opening formed in each of the sidewalls 146 for passage of the threaded bolt 62. A support member having a first pair of opposite sidewalls 148 and a second pair of opposite sidewalls 150 is mounted in the hollow support 144. A flange 152 is secured to the second pair of opposite sidewalls and extends downwardly therefrom and has an opening 154 formed therein. Each of the first 148 and second 150 opposite sidewalls has an opening formed therein for passage of the threaded bolt 62 so that the flange 152 can be mounted as illustrated in FIG. 10 or turned through ninety degrees. The adjustable clamp 130 can be used as the first 42 and second 44 clamp in FIG. 1.

In FIG. 9, there is illustrated a modification of the jaw 72 of FIG. 8. The modified jaw 72a is mounted on the base portion 74a and has a slanted surface 160 to accommodate the base 156 of either of the I-beams 4 and 6, the first reinforcing plate 22 and the second reinforcing plate 26 so that it can function as third clamp 46 in FIG. 1. One end of the lifeline 40 would be secured in the first clamp 42 and the other end would be connected to lifeline tensioning means, such as that illustrated and described in U.S. Pat. No. 5,458,214, mounted on the second clamp 44.

Figure 11:
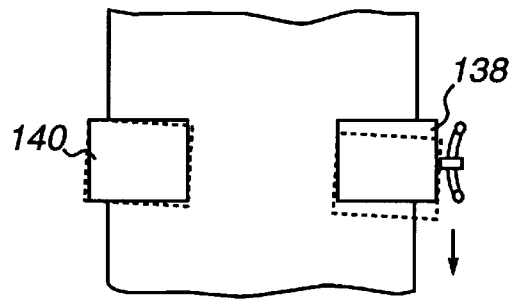
FIG. 11 is a top elevational view illustrating the movement of the clamp of FIG. 10 when a force is applied thereto.
Figure 12:
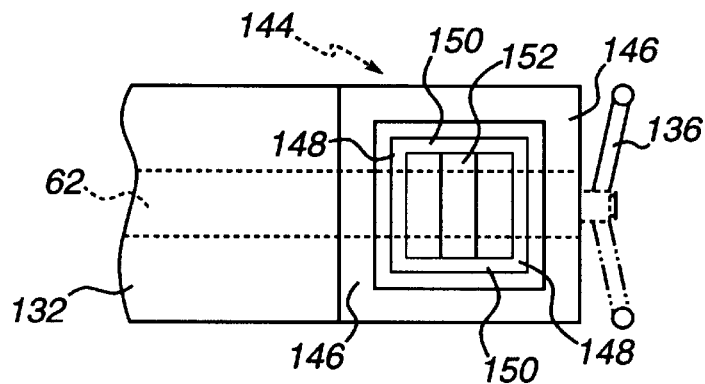
FIG. 12 is a bottom plan view of a portion of FIG. 10.

The movement of the adjustable clamp 130 when a load is placed thereon is illustrated in FIG. 11, the initial location of the jaws 138 and 140 is illustrated by the solid lines and the final location after a load has been placed thereon is illustrated by the dashed lines. In some instances, a portion of the sidewall 164 may be deformed.

Although the invention in this application has been described in relation to a lifeline support associated with a railroad bridge, it is understood that the clamping apparatus of this application can be used in a variety of ways with beams or rails to provide a fixed support for various types of apparatus.

It is contemplated that the inventive concepts herein described may be variously otherwise embodied and it is intended that the appended claims be construed to include alternative embodiments of the invention except insofar as limited by the prior art.

What is claimed is:

1. Clamping apparatus for mounting on a fixed support having opposite side edges comprising:

an outer elongated member having longitudinal axis;

an inner elongated member having a longitudinal axis;

at least a portion of said inner elongated member mounted inside of at least a portion of said outer elongated member to provide for relative sliding movement therebetween;

an elongated threaded bolt mounted within said outer elongated member for rotational movement around a fixed axis;

apparatus for rotating said elongated threaded bolt;

a threaded nut mounted at a fixed location within said outer elongated member and in threaded engagement with said elongated threaded bolt so that rotational movement of said elongated threaded bolt provides said relative sliding movement between said outer and inner elongated members;

a first jaw secured to said outer member for movement therewith;

said first jaw having an inclined surface located to be moved into contact with one said opposite side edges;

a second jaw secured to said inner elongated member;

said second jaw having an inclined surface located to be moved into contact with the other of said opposite side edges;

said outer elongated member having an outer surface facing a surface of said support so that, when said inclined surfaces of said first and second jaws are moved into contact with said opposite side edges, further rotation of said elongated threaded bolt forces said outer elongated surface of said outer member and said surface of said support into intimate contact; and said inner elongated member having at least another portion having an outer surface located substantially in the same plane as said outer surface of said outer elongated member so that said outer surface of said at least another portion of said inner member is also forced into intimate contact with another portion of said surface of said support.

2. The clamping apparatus as in claim 1 wherein:

said outer and inner elongated members having transverse cross-sectional configurations to prevent relative rotational movement therebetween.

3. The clamping apparatus as in claim 2 wherein:

said outer surface of said outer elongated member, said outer surface of said another portion of said inner elongated member and said surface of said support being generally planar.

4. The clamping apparatus as in claim 3 wherein:

said outer and inner elongated members are hollow and have generally rectangular transverse cross-sectional configurations.

5. The clamping apparatus as in claim 4 wherein:

said first jaw having a generally inverted U-shape transverse cross-sectional configuration with the leg portions thereof secured to opposite sidewalls of said outer elongated member;

said first jaw having a connecting portion integral with said legs and spaced from said outer surface of said outer elongated member;

said second jaw having a generally inverted U-shaped transverse cross-section configuration with the leg portions thereof secured to opposite sidewalls of said another portion of said inner elongated member; and said second jaw having a connecting portion integral with said legs and spaced from said outer surface of said another portion of said inner elongated member.

6. The clamping apparatus as in claim 5 wherein:

said first jaw having a flange portion extending outwardly therefrom and having a generally inverted U-shaped transverse cross-sectional configuration;

said inclined surface of said first jaw comprising two inclined surfaces each being located on said flange portion and being integral with one of said leg portions;

said second jaw having a flange portion extending outwardly therefrom and having a generally U-shaped transverse cross-sectional configuration; and said inclined surface of said second jaw comprising two inclined surfaces each being located on said flange portion and being integral with one of said leg portions.

7. The clamping apparatus as in claim 6 and further comprising:

a reinforcing member secured to portions of the leg portions of at least one of said first and second jaws and said flange portions thereof; and said reinforcing member having at least a portion thereof spaced from a connecting member of said flange portion integral with said connecting member of said first or second jaw.

* * * * *